United States Patent [19]

Lovitt, Jr.

[11] Patent Number: 4,960,359

[45] Date of Patent: Oct. 2, 1990

[54] DEMOUNTABLE SWING BOOM HOIST FOR FRONT END LOADERS

[76] Inventor: Estel L. Lovitt, Jr., 2266 Brendon Way, Sylvania, Ohio 43560

[21] Appl. No.: 299,671

[22] Filed: Jan. 23, 1989

[51] Int. Cl.[5] .......................... B65G 69/00; B66F 3/72; E02F 3/28

[52] U.S. Cl. .......................... 414/686; 414/687; 414/912

[58] Field of Search .......................... 414/686, 687, 912

[56] References Cited

U.S. PATENT DOCUMENTS

| | | | |
|---|---|---|---|
| 3,042,236 | 7/1962 | Pilch | 414/687 |
| 3,698,580 | 10/1972 | Carlson et al. | 414/687 |
| 3,732,996 | 5/1973 | Bauer | 414/686 |
| 3,771,677 | 11/1973 | Pilch | 414/687 |
| 4,111,319 | 9/1978 | Matsugoshi et al. | 414/686 |
| 4,142,642 | 3/1979 | Myers | 414/686 |
| 4,208,162 | 6/1980 | Nertzel | 414/686 |
| 4,397,603 | 8/1983 | Kraske et al. | 414/686 |
| 4,509,768 | 4/1985 | Haug | 414/686 |
| 4,802,814 | 2/1989 | Kourogi et al. | 414/686 |

*Primary Examiner*—David H. Brown
*Attorney, Agent, or Firm*—George R. Royer

[57] ABSTRACT

The subject device is an operational apparatus for front end loaders. The apparatus can be adapted directly onto the front end loader linkage arms at the attaching points that normally a bucket is attached to or can adapted by the means of a quick coupling attachment. The subject device should be used with a quick coupling device but is not limited to this device for its operation. The subject device herein is specifically adapted to a front end loader as an operational apparatus to perform various work functions such as a mobile crane, a front end loader, a fork lift or similar work functions in construction or railroad use but with an added dimension, that being the ability to swing 90°. Such a unit comprises an auxiliary operational mechanism having dimensional power motions when attached to a front end loader and is basically a swinging, lifting and tilting member for three dimensional movement actuated by hydraulic cylinders. The apparatus is equipped with a removable crane member that can be replaced by a bucket or fork lift forks or various other attachments that when so equipped can swing as much as 90° to perform various work functions, that may require the combined operations of swinging, tilting and lifting with or without articulating the front end loader.

1 Claim, 3 Drawing Sheets

VERTICAL AXIS
V.S.
900
600
570
560
500
480
476
460
450
320
350
10

FIG-3 - SUPPORT UNIT
FIG-4 - HORIZONTAL SWING UNIT
FIG-5 - V.S. UNIT
V.S. VERTICAL SWING
LIFT LINK
RAISE BOOM
LOWER BOOM
CAR CHASSIS
HYDRAULIC UNIT

HORIZONTAL SWING
H.S.1.
H.S.2

DEMOUNTABLE SWING BOOM HOIST FOR FRONT END LOADERS

DESCRIPTION OF PRIOR ART AND BACKGROUND OF THE INVENTION

The subject invention generally relates to front end loaders which are used for a variety of work functions such as removing dirt with a bucket. Historically, for many years front end loaders have been adapted with a variety of attachments that are attached through a quick coupling device. A quick coupling device when adapted to the end of loader linkage arms allows the front end loader to accept very quickly a variety of attachments to do a large variety of work in construction and railroad use. Historically, a front end laoder has been a mobile piece of construction equipment that when the loader linkage arms are raised so is the device that may be attached onto the loader linkage arms. The devices that have been put on a front end loader have been limited to only a up and down motion. When a front end loader is positioned in a close tight corner on railways or close to railroad rails then it becomes necessary to be able to take a mobile crane unit or similar device mounted on the front end loader arms by the means of a quick coupling device or direct mount and be able to swing 45° over the side and be able to swing a 90° back to the other side. Generally to perform functions such as this one could not use a front end loader, one had to use a mobile crane or a specific piece of construction equipment that was specifically designed for this purpose. As a necessity to utilize front end loaders for various functions a device such as the subject invention was required to add versitility to the front end loader, so the front end loader was not limited to only a vertically up and down motion. When the subject invention is attached to the front end loader linkage arms then the front end loader can now do an up and down motion, tilt forward and tilt back, swing 180° and also tilt the removeable crane member or other device forward or back. When the subject invention is adapted to a front end loader which has railwheels mounted on the end loader for on rail operation and is sitting on rail, the front end loader with subject invention can be equipped with a bucket for performing such work functions as traveling down the track with a load of dirt or stones and swing over the side 45° either side of the front end loader and dump the materials. The subject invention on this same front end loader can be equipped with a crane unit for handling materials. The subject invention can swing over to the side with the crane unit attached to the subject invention and pick and remove materials. The relative diversity for such work vehicles is important since it is often difficult in addition to being expensive to use one vehicle for each function. What is needed, in this regard, is a front end loader that can be adapted for on rail use or on rubber use that can perform a variety of functions, that has the ability to be able to swing materials 90°, lift them, tilt them, dump them or what it needs to do to perform the necessary work function. This invention is conceived accordingly and the following objects are directed to such end.

OBJECTS

The following are objects of the subject invention:

It is an object of the subject invention to provide an improved work apparatus for front end loaders used in construction and railroad work.

It is a further object of the subject invention to provide an improved method for front end loaders to transport materials on rail to a given site and be able to position or dump these materials, other than straight off the front of the front end loader.

A further object of the subject invention is to provide an improved method for front end loaders to handle materials off the side of the front end loader.

Yet another object is to provide versatility to the front end loader by adapting said invention to the front end loader which allows the front end loader to be for a larger variety of work functions.

Other and further objects of the subject invention will become apparent from a reading of the following description in connection with the drawings.

DRAWINGS

FIG. 3 is a side elevational view of the rear connection mechanism used with the subject device;

FIG. 4 is a side elevational view of the front part of the connecting device used in the subject invention;

FIG. 5 is a side elevational view of the boom mechanism;

DESCRIPTION OF PREFERRED EMBODIMENT

In describing the subject invention, it must be stressed that the subject is only of one preferred embodiment and that the scope of the claims appended hereto is not to be limited by the following description.

Figures 1, 2:
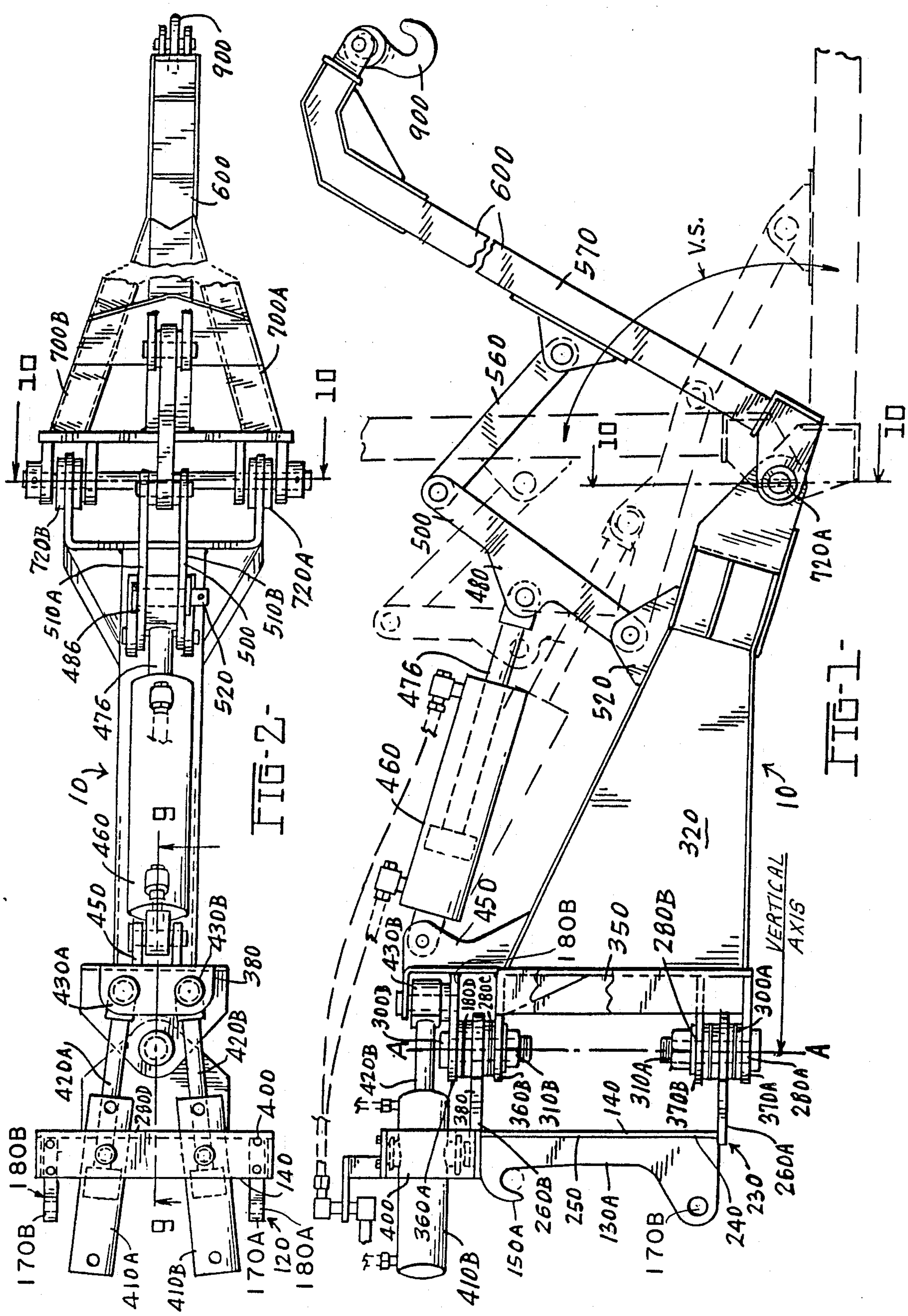
FIG. 1 is a side elevational view of the subject invention.
FIG. 2 is a top planar view of the subject invention.

Referring now to the drawings and particularly to FIG. 1 and 2, a crane apparatus 10 is shown, said crane 10 being constructed as a removeable unit that is adapted to be temporarily attached to a land based vehicle adapted for any number of work functions. A portion of the front part of the chassis 30 of such vehicle 20 is shown.

Figures 6, 7, 8:
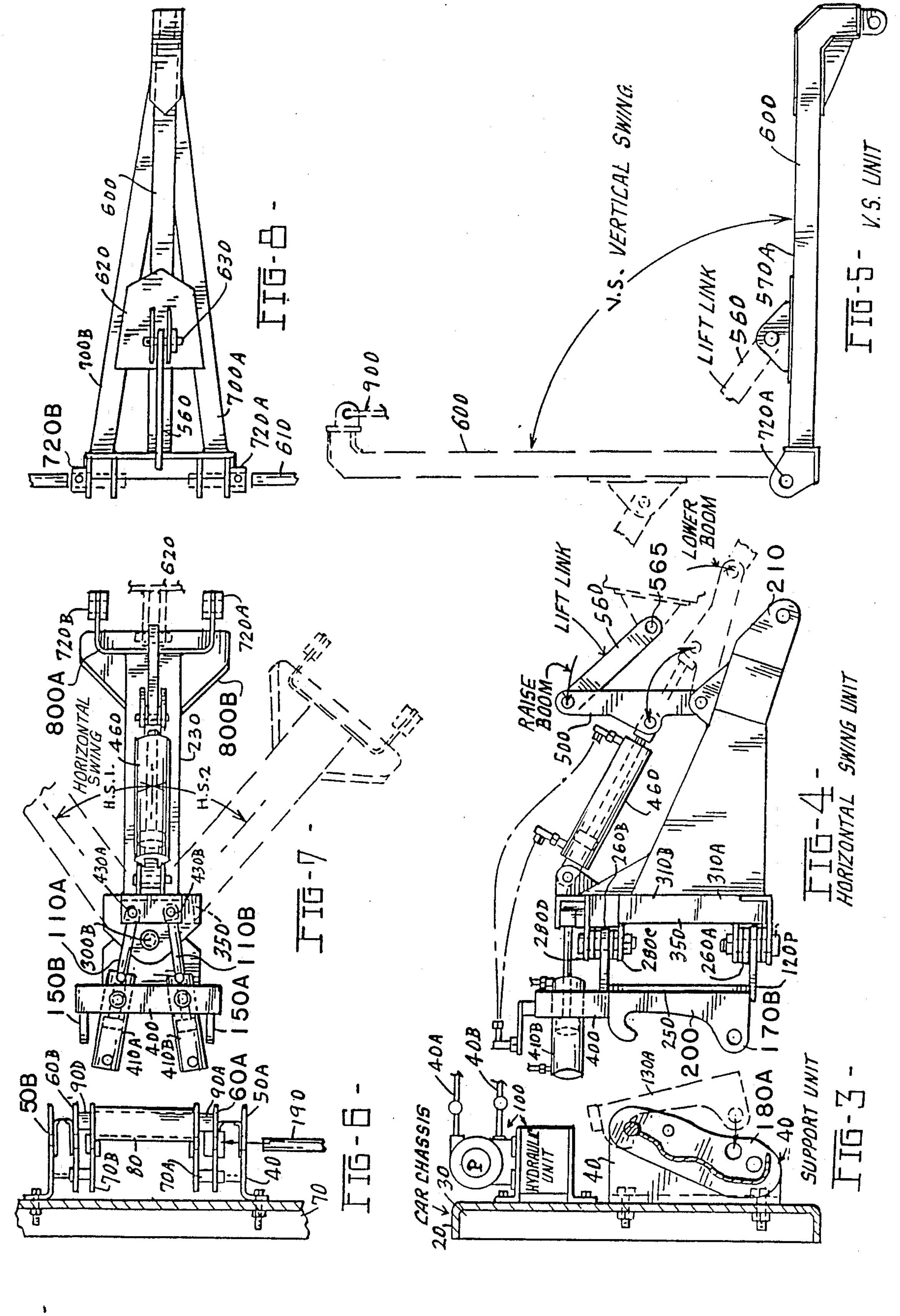
FIG. 6 is a top planar view of connecting mechanism for the subject device.
FIG. 7 is a top planar view of the pivot mechanism used to rotate the working end of the subject device.
FIG. 8 is a top planar view of the boom mechanism used in the subject device.

As can be seen in FIGS. 1 and 2, the front chassis 30 is provided with a connecting member 40, such connecting member functioning as the connection medium between the vehicle 20 and the crane apparatus 10. As can be seen, such connecting member 40 is affixed to the front surface of the the chassis 30 and serves as a support for the crane apparatus 10. As can be seen in FIGS. 1,2,3 and 6, the front support and connecting mechanism 40 is comprised in part of two parallel outboard support brackets 50A and 50B, which support brackets project forward in such parallel fashion towards the front of vehicle 20. As shown, the outboard parallel support brackets 50A and 50B are secured on their respective posterior portions to the vehicle chasis 20. Spaced inboard of each outboard parallel support 50A and 50B are a pair of parallel intermediate support brackets 60A and 60B which are connected on their respective outer surfaces to the respective inner faces, in a spaced distance manner, of the outboard parallel support members 50A and 50B. As shown in FIG. 6, two parallel inboard support brackets 70 and 70B are connected, also in a spaced distance relationship to the inner faces of the intermediate support brackets 60A and 60B. As can be determined from a view of FIG. 6, none of the intermediate support brackets 60A and 60B or the inboard support brackets are directly connected to the vehicle chassis 30, rather all such latter support brackets are connected ultimately to the outboard support brackets 50A and 50B. Interconnecting the inner faces of the inboard support brackets 70A and 70B is a cylindrical bar member 80 functioning to provide horizontal spacing between such respective inboard support brackets. Attention is again directed to FIGS. 3,6 and 9, and in this respective dispose in the upper frontal portion of the spatial area between the inboard support snd intermediate support brackets are cylindrical connecting pins 90A and 90B. Specifically, such connecting pins 90A and 90B are interconnected in a horizontal position, between the respective inner faces of the intermediate support brackets 60A and 60B and the outer faces of the inboard support brackets 70A and 70B. In the latter positioning relationship the connecting pins are securely and firmly anchord as the main support members between the connecting member 20 and crane mechanism 10, as more fully described below. Affixed to the frontal surface of the chassis of vehicle 20 is the hydraulic pump and control unit 100, as schematically shown in FIG. 3. The hydraulic pump and control unit functions to provide the necessary hydraulic pressures through connecting lines 110A, 110B....to actuate hydraulically actuated cylinders intergrally affixed on the crane member 10, as more fully described below.

Figure 9:
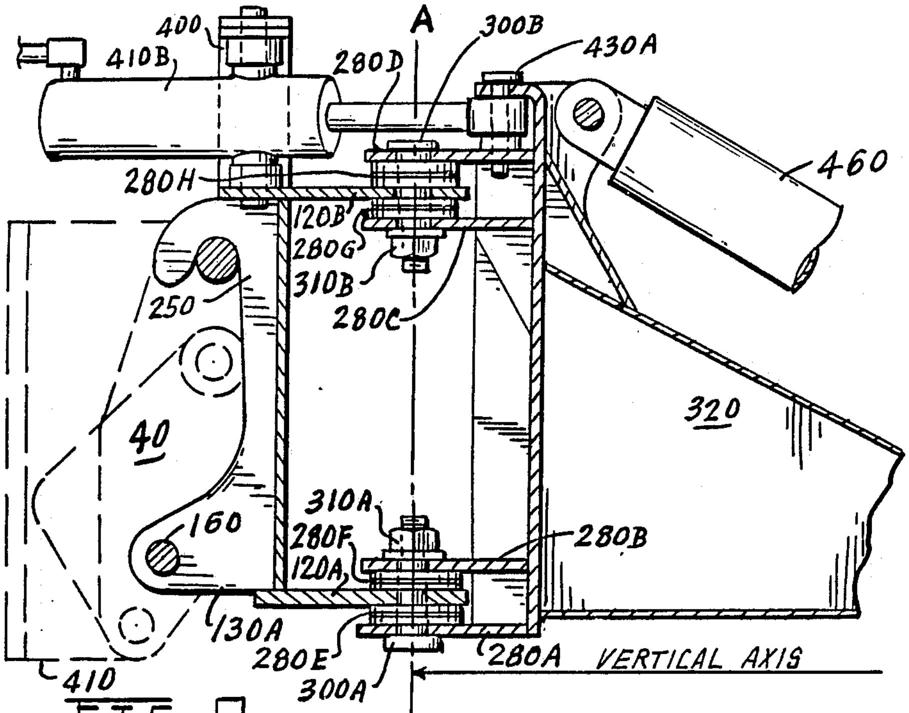
FIG. 9 is a sectional view along line 9—9 of FIG. 2 of the connecting mechanism shown in FIG. 3.
Figure 10:
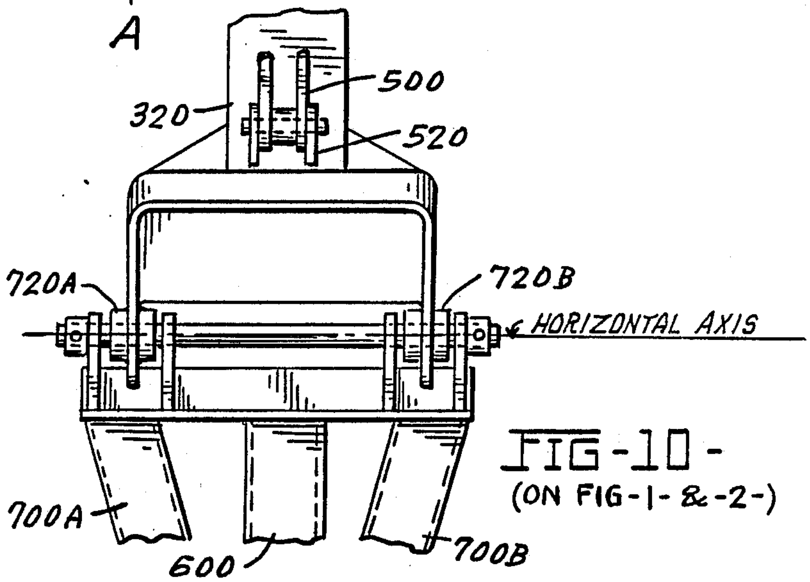
FIG. 10 is a sectional view along line 10—10 of FIG. 1 and / or FIG. 2 of the connecting mechanism for the vertical swing movement of the crane member.

Attention is now directed to FIGS. 1,2,4 and 7, in which drawings the crane apparatus 10 is represented. As can be seen, the crane apparatus 10 is a longitudinally extending member along the longitudinal central axis front-to-back axis of the vehicle 20. The rear portion 120 of the crane 10 is adapted to be joined to the support and to connecting member 40 through a pair of connecting pawls or panels 130A and 130B. As shown in FIG. 1, the connecting panels are parallel plate members intergrally affixed to the rear most surface portion 140 of the crane apparatus 10. The connecting pawls or panels 130A and 130B, as seen from a side elevational view, as shown in FIG. 1, each have an upper tang like member 150A and 150B, which tang member projects rearwardly in a downwardly hooking manner so that the respective tangs can fit over, the respective connecting pins 90A and 90B as schematically shown in FIGS. 3 and 9. The lower portion of each connecting pawl 130A and 130B is enlarged having a locking pin opening 170A and 170B therethrough. Once the lower surface of each tang member 150A and 150B is engaged over the upper surfaces of the connecting pin members 90A and 90B, the lower portion of connecting panels are rotated downwardly and rearwardly so that the locking pin openings 170A and 170B are axially aligned with corresponding openings 180A and 180B in the lower part of the outboard support plate 50A and 50B, and correspondingly aligned openings in the intermediate support plates 60A and 60B, and inboard support plates 70A and 70B. Once respective latter openings are aligned with the corresponding connecting pin openings in the pawl members 130A and 130B, a connecting pin, such as pin 190, shown in FIG. 6 is inserted to lock to the connecting panels in place relative to the connecting member 40, in the position shown in FIG. 9.

Referring now FIGS. 1,2,4,5,7 and 8, the crane apparatus 10 is comprised of elements which allow vertical and horizontal movement of the unit, both of which movements are powered by hydraulic means, as indicated above. As can be seen, the rear section 200 of crane unit 10 is basically the horizontal swing portion, while the forward section 210 of crane 10 is the vertical lift portion of the crane 10. The most rearward position of section 200 of the crane 10 is comprised of hydraulically-operated hinge mechanism 230, adapted for the horizontal swing movement of the crane 10 about a vertical axis A—A shown in FIG. 1. As seen in FIGS. 1,2 and 4, the posterior portion of the hinge member 230 is the bracket 240, the rear face 250 of which supports the connecting panels 130A and 130B, as described above. The bracket 240, by reason of the connecting panels 130A and 130B being securely affixed to the connecting member 40 becomes the fixed, non moveable element of the hinge member 230. The bracket 240 has two forwardly extending anchor plates 260A and 260B, which anchor plates are parallel members extending respectively from the lower and upper portions of the vertically disposed bracket 240 that supports the connecting panels 130A and 130B. Anchor plates 260A and 260B are provided with axially aligned openings 300A and 300B for receiving hinge bolts 310A and 310B.

The forward part of the hinge member 230 is brace member 320. As shown, the brace member 320, as seen from the side elevational view of FIG. 1 is is triangular in configuration, but has a relatively narrow shank, when viewed from the top elevational view of FIG. 2. Disposed on the rear vertical face 350 of the brace member 320 are two pairs of horizontally and rearwardly projecting tongues 360 and 360B, disposed on the upper part of of vertical face 350, and tongues 370A and 370B disposed on the lower part of such face 350. As seen, the tongues 360A, 360B, 370A and 370B are adapted, as shown in FIG. 1, to matingly engaged the respective adjoining anchor plates 260A and 260B, such that the respective openings 280A, 280B, 280C, and 280D therein are aligned with the mating openings 300A and 300B in the anchor plates 260A and 260B. As aligned in such latter relationship, pivot and locking bolts 310A and 310B secure the respective hinge members together such that brace member 320 can move in a horizontal sweep about the vertical axis A—A, which is aligned with the vertical axis of bolts 310A and 310B.

Referring to FIGS. 1 and 2, integrally disposed in the upper surface portion of the fixed vertical plate 240 is horizontal brace member 400 to which are affixed a pair of hydraulic cylinders 410A and 410B, which cylinders are angled inwardly towards their respective rear portions, as shown in FIG. 2. The actuating arms 420A and 420B of such cylinders are pivotally connected to pivot pins 430A and 430B integrally affixed to the upper portion of the brace member 320. Thus, when the hydraulic cylinders 410A and 410B actuate arms 420A or 420B, corresponding lateral, horizontal movement of the brace will be actuated about the vertical axis A—A of the hinge mechanism 230.

Referring again to FIGS. 1 and 2, disposed on the upper front portion of the brace member 320 is a first vertical hinge member 450 with the posterior end of a hydraulic cylinder 460 affixed in a limited pivotable manner to such first vetical hinge, as shown. The forward end of the working arm 476 of such hydraulic cylinder 460 is pivotably mounted through a pivotable connector 480 disposed in the middle of the longitudinal distance of the secondary boom 500. In the preferred embodiment, the secondary boom is a bifurcated member comprised of parallel plate members 510A and 510B pined in tandem fashion. As shown in the drawings, the lower end of the secondary boom 500 is pivotably mounted to the upper surface of the swing beam 320 through pivot member 520. By this latter construction arrangement, the secondary boom can be moved in a limited vertical sweep of approximately 40° rotation as can be seen from the drawings. Pivotally connected to the upper part of the secondary boom 500 is an intermediate connecting boom 560. As shown, intermediate connecting boom 560 is pivotably mounted through pivot connecting member 565 on its forward end to the middle of the longitudinal shank portion 570 of the primary boom 600, shown in FIGS. 1 and 2. The primary boom 600 is pivotably mounted on its lower end through bifurcated legs 700A and 700B to the forward section of the beam 320 through tandemly-mounted hinged pivot members 720A and 720B. The pivot members 720A and 720B are affixed in a rearwardly projecting direction through dual arms 800A and 800B affixed to the forward, lower portion of the swing beam 320. As seen, the upper part of the boom is provided with a retractable hook member 900. Further, as diagramatically shown in the drawings, the boom can be moved in generally a 90° vertical arc, schematically shown by arc designated in FIGS. 1 and 5.

What is claimed is:

1. A swing boom hoist apparatus for temporary attachment to a motor vehicle, having a chassis, said apparatus comprising in combination:

(a) a connecting member of vertical disposition, and wherein said connecting member comprises two parallel support brackets affixed to a frontal portion of said vehicle chassis, and wherein said connecting member further comprises two parallel inner support brackets which are disposed inside of such outer support brackets and each which inner support bracket is connected only to the nearest adjacent outer support bracket, and wherein said connecting member has a cylindrical bar member integrally affixed in a transverse manner between such inner support members, and wherein said connecting member has cylindrical connecting pins integrally affixed adjacent said cylindrical member;

(b) a longitudinally extending crane member with a frontal portion and a posterior portion, said crane member having a pair of connecting pawl members integrally disposed on the posterior portion of said crane member, said connecting pawls being interconnected to the frontal portion of said connecting member by joining each said pawl member to each of said connecting pins on said connecting member, and said crane member having hydraulically operated and horizontally rotatable hinge means on the posterior portion of said crane member so as to permit said crane to move about said hinge in a horizontal plane and about a vertical axis said hinge means comprising in part a triangular-shaped brace means on the forward portion of said hinge means member, as seen from an upper elevational view;

(c) secondary boom means affixed to said crane member said second boom means comprising a bifurcatred member comprised of parallel plate members;

(e) intermediate boom member connected to said secondary boom members.

* * * * *